United States Patent [19]
Bilbrey et al.

[11] 3,826,001

[45] July 30, 1974

[54] CABLE STRIPPING TOOL

[75] Inventors: Robert A. Bilbrey, Orinda; Walter J. Maytham, Los Altos, both of Calif.

[73] Assignee: Speed Systems, Inc., Los Altos, Calif.

[22] Filed: Apr. 30, 1973

[21] Appl. No.: 355,957

[52] U.S. Cl. .................................. 30/90.1, 30/142
[51] Int. Cl. ............................................. H02g 1/12
[58] Field of Search ......... 30/90.7, 90.1, 90.6, 90.4, 30/90.8, 90.9, 91.2, 142, 123 R; 81/9.5 R; 7/14.1

[56] References Cited
UNITED STATES PATENTS
3,665,603  5/1972  Bilbrey et al. ..................... 30/90.7

Primary Examiner—Othell M. Simpson
Assistant Examiner—Roscoe V. Parker
Attorney, Agent, or Firm—Phillips, Moore, Weissenberger Lempio & Strabala

[57] ABSTRACT

A tool for removing insulation from cables includes a means for supporting cables of differing diameters in the tool while permitting rotation of the tool relative to the cable. The tool includes a main insulation cutting blade whose depth of cut may be selectively varied and whose angular disposition relative to the cable may be selectively changed so the blade will cut a track through the insulation without the application of any axial pressure. The tool further has a scribing blade whose depth of cut and disposition may also be varied for scribing portions of the insulation known as the semiconductor layer. Means are also provided for rendering one of the blades inoperative when the other is being used.

16 Claims, 7 Drawing Figures

PATENTED JUL 30 1974 3,826,001

CABLE STRIPPING TOOL

BACKGROUND OF THE INVENTION

1. Field of the Invention

This invention relates to cable stripping tools; and, more particularly, to tools for stripping insulation off of electrical conductors.

2. Description of the Prior Art

Various tools have been developed for stripping the insulation and protective layers from electrical cables having a central core conductor, such as the tool shown in U.S. Pat. No. 3,665,603 issued to Bilbrey et al. Because these cables have different outer and inner diameters depending in their manufacture, these tools should be fully adjustable with regard to both the cable engaging jaws and the depth of cut. Further, in these tools it is desirable to employ a blade which will "plow" the insulating layer away from the core conductor of the cables.

SUMMARY OF THE INVENTION

It is an object of this invention to provide a cable stripping tool having individual blades for plowing and scribing the insulated layers of cables.

It is a further object of this invention to provide an interlock between such blades so that one blade is rendered inoperative when the other is being used.

It is a still further object to provide such cable stripping tool with two blades whose depths of cut may be varied and whose angular disposition relative to the cable being cut may be changed.

These and other objects are preferably accomplished by providing a tool that includes means for supporting cables of differing diameters in the tool while permitting rotation of the tool relative to the cable. The tool includes a main insulator cutting blade whose depth of cut may be selectively varied and whose angular disposition relative to the cable may be selectively changed so as to permit the cutting of a spiral track or path through the insulation without the application of any axial pressure and which likewise permits the ends of the track or path to be squared. The tool further includes a scribing blade whose depth of cut and disposition may also be varied for scribing the insulation. Means are also provided for rendering one of the blades inoperative when the other is being used.

DESCRIPTION OF THE PREFERRED EMBODIMENTS

Figure 1:
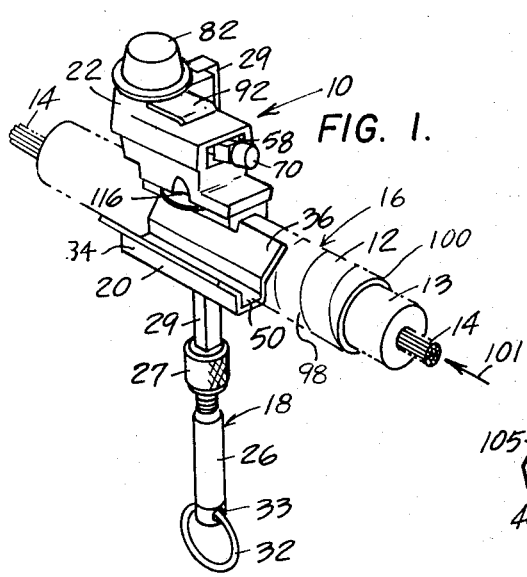
FIG. 1 is a perspective view of the tool of the invention showing a cable operatively positioned therein.

Referring to FIG. 1 of the drawing, a tool 10 is shown which is designed to remove or strip covering 12 or a similar covering overlying insulation 13 covering the core or conductor 14 of a large diameter cable 16. The cable may have a diameter of from about 3/4 inch to 2 inches, and the insulation provided on such cables may include a number of concentric layers of insulating and protective materials, frequently of substantially greater cross-sectional extent than that of the conductor itself. These materials include rubber, light metal shielding, polyvinyl chlorides, synthetic elastomers and semiconductors possessing different degrees of thickness and cutting resistance. Thus, the reference to insulation used herein may refer to any of these layers overlying core or conductor 14. That is, tool 10 may be used to strip either covering 12 alone, insulator 13 alone — after covering 12 is removed — or both.

Tool 10 thus includes a manually engageable handle 18, means 20 for supporting the cable 16 in a rotatably clamped condition, and a knives holding assembly 22. As will be described further hereinbelow, the assembly 22 is adapted to hold a pair of knive blades 24, 25 (see FIG. 2) for selective movement from and toward cable 16 and for selective angular positioning relative thereto.

Handle 18 consists of a longitudinally extending rod-like member having a manually engageable grip portion 26 at its lower end portion. The assembly 22 is provided with a bifurcated element 28 which embraces the upper end portion of a rod member 29 which is substantially rectangular in cross-section. Such rod member 29 is fixedly secured in a channel 29a of like cross-section by any suitable means, such as a capscrew 30 which extends through an aperture 31 in rod member 29 and into a threaded aperture 30a in channel 29a of assembly 22.

Handle grip portion 26 includes a carrying ring 32 at its lower end, extending through aperture 33 therein, and is threaded at its upper end for insertion into a collar member 27. Collar member 27 may be knurled or the like on its outer surface for convenient gripping thereof (see also FIG. 3). The upper end of the threaded portion of grip portion 26, as shown in dotted lines in FIG. 3, terminates in an integral extension portion 27a of generally rectangular cross-section which is adapted to be inserted in a yoke-like portion 29b (see also FIG. 2) forming the lower end of rod member 29. A locking pin 27b may be fixedly secured within aligned apertures in yoke-like portion 29b and the upper end 27a of grip portion 26 in a manner permitting pivotal movement between grip portion 26 and rod member 29 (as indicated by the dotted line position of these members in FIG. 3). Gripping member 27 has an inner diameter slightly greater than the lowermost end 29c of rod member 29 (see also FIG. 2) so that tightening of gripping member 27 locks members 26 and 29 from relative movement.

Figure 3:
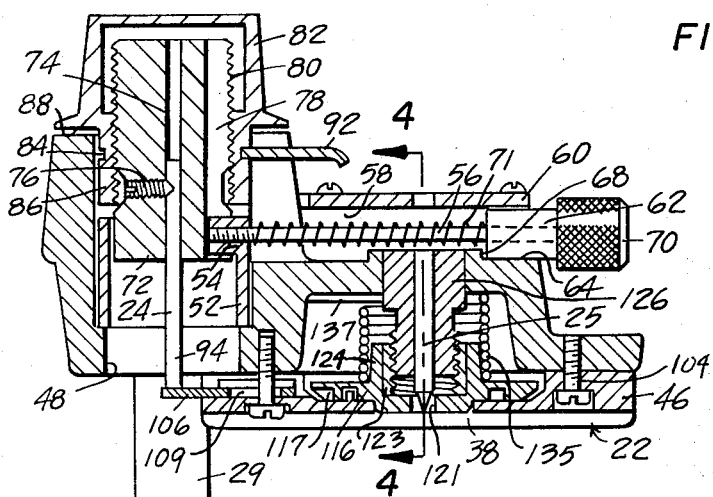
FIG. 3 is a side elevational view, partly in cross-section, of the tool of FIG. 1.

It will be noted from FIG. 3 that the assembly 22 extends laterally outwardly from the handle 18, and intermediate the assembly 22 and the handle grip portion 26 there is provided a block 34 slidably mounted on the handle for longitudinal movement therealong. The block 34 has a bore 35 of the same cross-sectional configuration as rod member 29 permitting such movement, and preferably both rod member 29 and the bore 35 are of the same configuration (i.e., generally rectangular as indicated above and not circular) so as to prevent any movement other than the aforesaid longitudinal movement. Carried on block 34 is a portion of the cable support means 20, and as here shown, such means includes a generally V-shaped saddle 36 (see FIG. 1) having an included angle of about 90° and a channel at the apex 50 thereof on which the cable 16 may be positioned as shown in FIG. 1. The saddle 36 extends laterally outwardly from handle 18, as shown in FIG. 3, in parallel subjacent relation to assembly 22, and the lower surface of assembly 22 is provided with a generally planar cable engaging shoe element 38 adapted to overlie an upper lineal line portion of cable 16 when the latter is seated on the saddle 36. Such element 38 is preferably formed of a low friction resistance material, such as tetrafluoroethylene, and as best shown in FIG. 3, the upper walls of saddle 36 are likewise provided with similar shoe elements 40 (one visible in FIG. 3) which likewise engage the cable in lineal line contact.

To accomodate different sized cables, block 34 is moved downwardly along rod member 29, the cable is inserted between the upper cable engaging element 38 and the lower elements 40 on saddle 36, and the block 34 is then moved upwardly until the cable is firmly grasped therebetween. Then, by means of a set screw 44 (shown in dotted lines in FIG. 3) extending through the block 34, the latter, together with the saddle 36, may be located relative to the handle 18 and assembly 22. As will be understood, this arrangement permits the reception of a wide range of cable diameters, insures proper clamping of the cable 16 in tool 10, but still permits rotation of the entire tool 10 relative to cable 16, due to the three line lineal contact provided by the cable engaging elements 38, 40 and 42. It should also be understood that in place of such engaging elements, rollers might be provided, but this would add to the complexity and cost of the tool 10.

Figure 4:
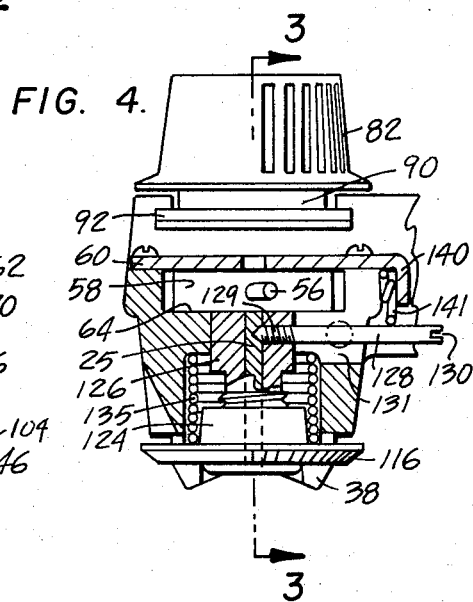
FIG. 4 is an end elevational view, partly in cross-sectional, of a portion of the tool of FIG. 1.

Referring now to assembly 22, it will be seen that the laterally extending cable engaging element 38 (see particularly FIGS. 2 and 3) underlies a generally rectangularly shaped housing 46, and the end of the housing 46 adjacent handle 18 is provided with a bore 48 having its axis overlying and intersecting the internal apex 50 of saddle 36. A bushing 52 is journalled in bore 48 and is provided with an axially extending lug 54 along an interior wall thereof. A slider rod 56 is secured to bushing 52 adjacent lug 54 and extends radially outwardly from bushing 52 generally along the length of housing 46. The latter, adjacent bore 48, has an opening 58 communicating with the bore 48 and extending to the other end of housing 46 and a cover plate 60 overlying the same. The rod 56 extends from threaded engagement with bushing 52 to such other end of the housing 46 through the opening 58 and is thus capable of swinging movement in a plane parallel to the axis of the cable 16 positioned in tool 10, but limited in its arcuate extent by the width of the opening 58 as best indicated in FIG. 4. The distal portion of rod 56 extends through a guide block 62, generally square in cross-section, which moves along an arcuate track 64 provided on housing 46, the lower end of block 62 slidably engaging a shoulder 68 provided on the housing 46 (see FIG. 3). The rod 56 has a manually engageable knob 70 at its distal end, and the inner end thereof is threadably connected to bushing 52 and/or the lug 54 thereof. By loosening the knob 70, the rod 56, and consequently the bushing 52 and its associated lug 54 may be freely rotated in the housing bore 48 to the extent provided for by the width of the opening 58. However, by tightening the knob 70, the guide block 62 will be forced against shoulder 68 and the bushing lug 54 will thus be locked in selective positions of rotational displacement. As will be explained further hereinbelow, such positioning of lug 54 determines the angular disposition of the knife blade 24 relative to cable 16. Finally, a spring 71 may be providing surrounding rod 56 as shown.

Positioned within bushing 52 is a generally cylindrical knife holding element 72 provided with a radial slot 74 in which blade 24 is positioned. A set screw 76 or other fastening means is provided to releasably secure blade 24 in the element 72. A second slot 78 is provided in the element 72 which interfits with the bushing lug 54 so that a rotation of the bushing 52 as described hereinabove produces a similar rotation of element 72 and the knife blade 24 contained therein. The upper portion of element 72 is threaded as indicated at 80, and engageable therewith is an internally threaded blade depth control knob 82. The knob 82 is provided with a circumferential groove 84 on a radially reduced portion 86 thereof, the knob shoulder 88 resting on the upper end portion of housing 46. The latter is provided with a corresponding groove 90 (see FIG. 4), and the knob 82 is retained against axial displacement by means of a retainer lug 92 which is a bifurcated element insertable into the grooves 84 and 90 (see also FIG. 1). In this manner, as the knob 82 is rotated, but prevented against axial movement, the element 72, with knife blade 24 attached thereto, moves up or down relative to the space defining by the cable supporting shoe elements from an inoperative position out of such space to the operative position illustrated in the drawing.

Figure 2:
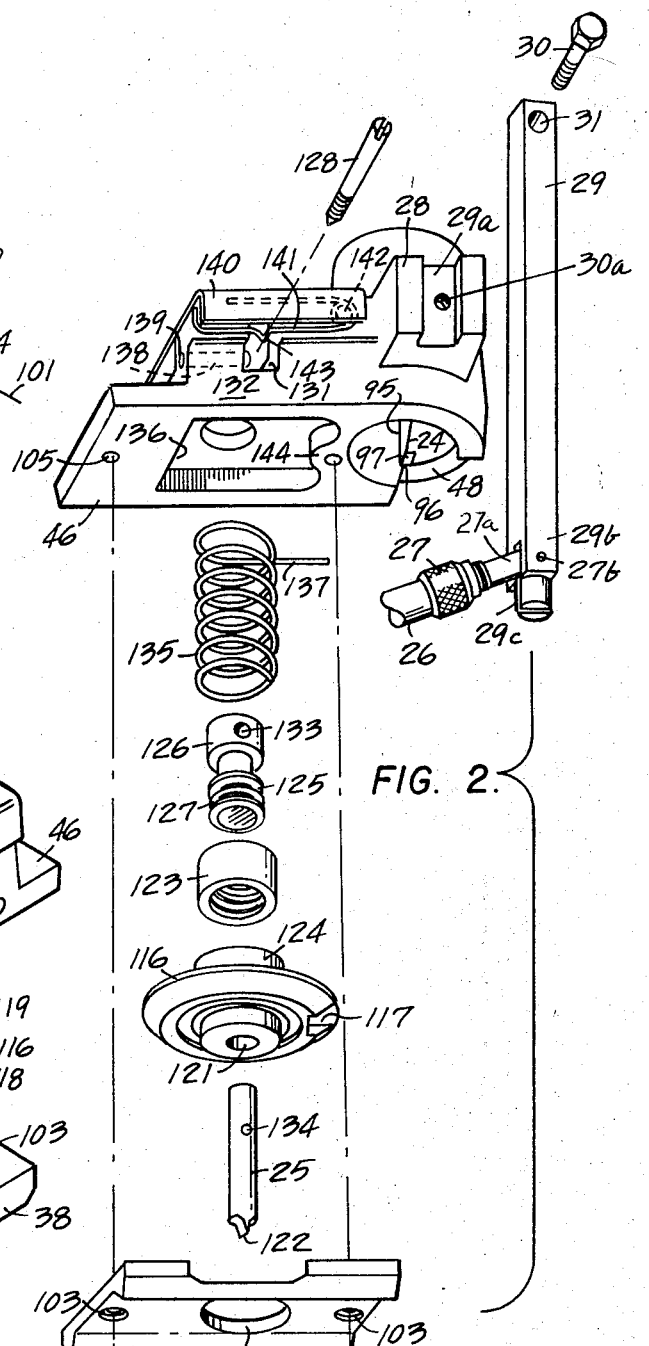
FIG. 2 is an exploded view of a portion of the tool of FIG. 1.
Figure 5:
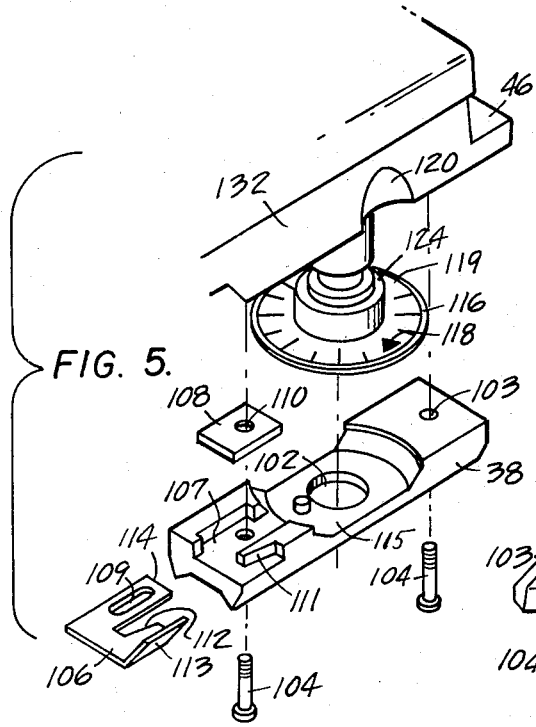
FIG. 5 is an exploded view of a portion of the view of FIG. 2.
Figure 6:
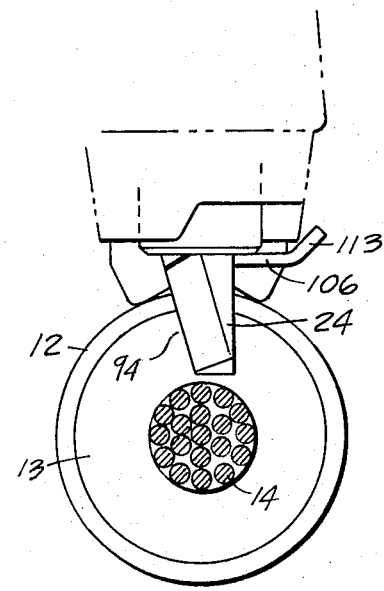
FIG. 6 is an end elevational view, partly in phantom, of a portion of the tool of FIG. 1 showing a cable engaged by the main blade thereof.

Referring now to FIGS. 2 and 5, shoe element 38 includes a generally centrally located aperture 102 and a pair of spaced openings 103 for receiving screws 104 or the like. Openings 103 are aligned with threaded apertures 105 in the underside of housing 46 so that element 38 may be securely fastened thereto. As shown in FIG. 5, an apertured plate 106 is adapted to be inserted into a slot 107 formed in element 38. A spacer 108 is mounted above plate 106 and is disposed below housing 46 when element 38 is secured thereto. Screws 104 pass through the elongated slot 109 in plate 106 and an aperture 110 insspacer 108. Spacer 108 is retained within the walls forming slot 108. It can be seen in FIG. 5 that plate 106 is slidable along slot 109 within slot 107. Plate 106 is configured so as to pass about one of the side walls forming slot 107 (i.e., side wall 111 entering cut out portion 112 of plate 106). As shown in FIG. 3, plate 106 is thus movable from a first position extending outside of element 38 under the lowermost edge 96 of blade 24 when blade 24 is in the FIG. 3 position to a second position (see FIG. 6) out of engagement with blade 24 (and within element 38). One end of plate 106 may be bent upwardly as at bent portion 113 to assist in moving plate 106 within slot 107.

When plate 106 is moved in its second position, the front portion 114 thereof enters a generally circular depression 115 formed in element 38 surrounding aperture 102. An indexing disk 116 includes a cut-out portion 117 which is generally related to the configuration of the front portion 114 of plate 106. Thus, when portion 114 enters the cut-out portion 117, the indexing disk 116 cannot be rotated. Of course, disk 116 must be aligned with plate 106 before portion 114 thereof can enter cut-out portion 117. This provides an interlock for tool 10. That is, as shown in FIG. 5, when the indexing indicia 118 on the upper surface 119 of disk 116 is aligned with the depressed area 120 on housing 46, blade 24 may be raised or lowered by merely moving plate 106 out of the way (i.e., into portion 117). As will be described further hereinbelow, this is the only position in which the scribing blade 25 may be lowered. Thus, tool 10 may be used more efficiently since it never allows both blades 24, 25 to be down in cutting position at the same time. This interlock permits the tool 10 to be used without the problem of forgetting to raise blade 24 prior to using scribing blade 25.

It can be seen in FIG. 2 that disk 116 has a generally centrally located aperture 121 extending therethrough for receiving blade 25 therein. Blade 25 may be similar to blade 24, but need not be as large as blade 24. It may thus have a flat bottom cutting surface 122 (see also FIG. 7) and it may be sharper than blade 25.

A threaded collar member 123 is disposed above disk 116 (see FIG. 2) and is adapted to be inserted into a collar 124 integral with the top of disk 116 in close fitting engagement therewith. A blade receiving member 125 having a collar portion 126 and a lower threaded portion 127 is disposed above collar 123. Threaded portion 127 threads into collar 123. A pin 128 having threaded portion 129 at one end and a screw driver receiving head 130 at its other end is adapted to be inserted in an opening 131 formed in the side wall 132 of housing 46. Threaded portion 129 threads into a threaded aperture 133 in collar portion 126 of blade receiving member 125 and into the threaded aperture 134 at the top of blade 25. A helical spring 135 surrounds collar 124 of disk 116 and member 125 when assembled by securing element 38 to housing 46. That is, spring 135 is compressed within the opening 136 at the bottom of housing 146. The elongated end 137 of spring 135 abuts against the portion 144 of opening 136. A threaded aperture 138 extends through housing 46 transverse to pin 128. A set screw 139 or the like is threaded therein. This set screw 139 is adapted to bear against pin 128. In addition, a flange member 140 (see also FIG. 4) overhangs opening 131. A spring member 141 is secured at 142 to housing 46 and extends across the top of opening 131 and above pin 128 when assembled. This spring member 141 has its free end retained by flange member 140 and bears down against the top of pin 128. Spring member 141 is configured as at 143 to provide a two-position setting for pin 128 (i.e., on each side of the configured portion 143).

The operation of tool 10 may best be described by explaining how main cutting blade 24 may be used to remove either covering 12 or 13 off of conductor 14. Of course, these coverings 12, 13 may be so hard to cut that blade 25 should be used initially for scribing the other surface prior to use of blade 24. Thus, the mode of cutting — which will be described with respect to FIG. 1 — of blade 24 is also applicable to the mode of cutting with blade 25. It will be seen that, for example, if covering 12 is particularly hard, it should be scribed first using blade 25. Also, the depth of cutting may be more easily controlled using blade 25 first. This is important since it is not desirable to scratch the surface of insulator 13, for example, when cutting covering 12, since dust or the like may build up in such scratches.

Accordingly, in operation, tool 10 is moved onto the cable 16 as shown in FIG. 1, and block 34 is tightened on the rod member 29 when the shoe elements 38, 40 and 42 are clamped about cable 16. Prior to insertion of the cable 16, knob 82 is rotated so that the blade 24 is in a raised position. The blade 25 is locked in noncutting position as discussed above with blade 24 unlocked (i.e., not blocked by plate 106). Blade 24 is provided with a leading cutting edge 94 (FIG. 3) and a lower edge or lid 96 which may have an integral shoe 97 or the like sloping slightly upward from lower edge 96 as shown in FIG. 2. The side 95 of blade 24, visible in FIG. 2, is sharpened to a point along the vertical extent of blade 24. The sides forming shoe 97 are also sharp. If a typical end strip operation is being performed, which provides for the conductor 14 of cable 16 extending past the end of covering 12, as shown on the left portion of cable 16 in FIG. 1, knife blade 24 is positioned adjacent the end of covering 12 by rotation of knob 82, and the knob 70 and its associated spring-biased rod 56 is rocked so that the blade receiving slot 74 and blade 24 therein is moved to an angular position. In other words, the blade 24 may be moved between a first position wherein it is generally normal to the axis of the cable 16 and a plurality of other positions wherein it is angularly related thereto. With blade 24 placed against the covering 12 and in angular disposition thereto, the operator, by engaging grip portion 26 of handle 18, after locking the handle 18 in the FIG. 3 — solid line — position as discussed hereinabove, may rotate tool 10 about cable 16 in a clockwise direction as viewed in FIG. 1 looking in the direction of arrow 101, and blade 24 will carve a spiral path 98 thereon through covering 12. When the desired length has been cut, the rod 56 is moved to one end of its travel which repositions knife blade 24 to its first normally related position on cable 16 so that further rotation of tool 19 about cable 16 produces a simple circular cut 100 transverse to the axis of cable 16. The blade 24 may then be raised clear of cable 16 by rotation of knob 82 and tool 10 removed by lowering saddle 36. The convoluted cut covering 12 may then be peeled off of cable 16.

With this construction, it can be appreciated that a "T" cut as illustrated in FIG. 1 may be made. Here, the initial cut is circular, with the blade 24 normal to cable 16 and urged into the covering 12 by rotation of knob 82; blade 24 is then angled to produce the spiral cut; and blade 24 then returned to the finished circular cut. Removal of the thus cut covering 12 lays bare the insulation 13 overlying conductor 14. If desired, insulation 13 may be cut in like manner. Particularly in connection with blind cuts such as for a "T," knob 82 may be provided with a clicking detent and/or a depth measuring scale so that the amount of blade penetration through covering 12 and insulation 13 may be more readily determined.

As noted hereinabove, the covering 12 and/or insulation 13 may be of an extremely hard material, such as a hard carbon material or the like. Accordingly, it may be extremely difficult to cut either covering 12 or the insulation 13 with blade 24, as described hereinabove. Accordingly, it is necessary in such cases to first scribe the outer surface of such covering 12 or insulation 13.

In other words, covering 12 or insulation 13 may be so hard that it is difficult to initiate a cut with blade 24 alone. Thus, the blade 24, as shown in FIG. 3, is raised above plate 106 and plate 106 is disposed below the bottom edge 96 of blade 24. At this point disk 116 may be in any position but the locked position. If disk 116 is in the locked position, blade 24 may be lowered as will be discussed hereinabove by sliding plate 106 into the cut-out portion 117 of disk 116. Since plate 106 is disposed in portion 117, the disk 116 cannot rotate and blade 25 cannot be lowered. When plate 106 is slid out of portion 117, disk 116 may now be rotated to lower blade 25. Thus, a novel interlock is described whereby both blades 24 and 25 cannot be lowered at the same time.

Figure 7:
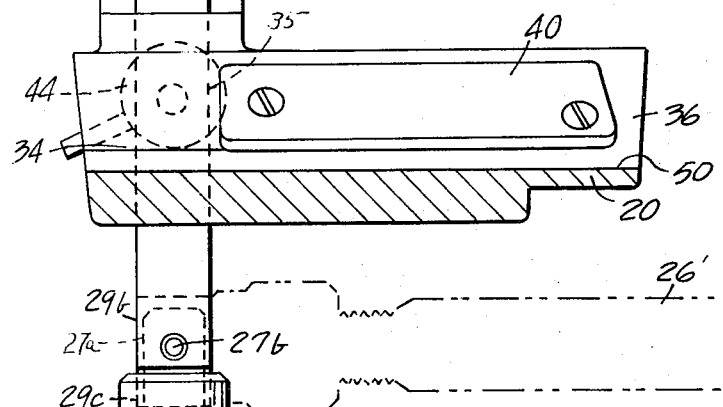
FIG. 7 is an elevational view similar to FIG. 6 from the opposite end thereof showing a cable engaged by the scribing blade thereof.
Figure 7:
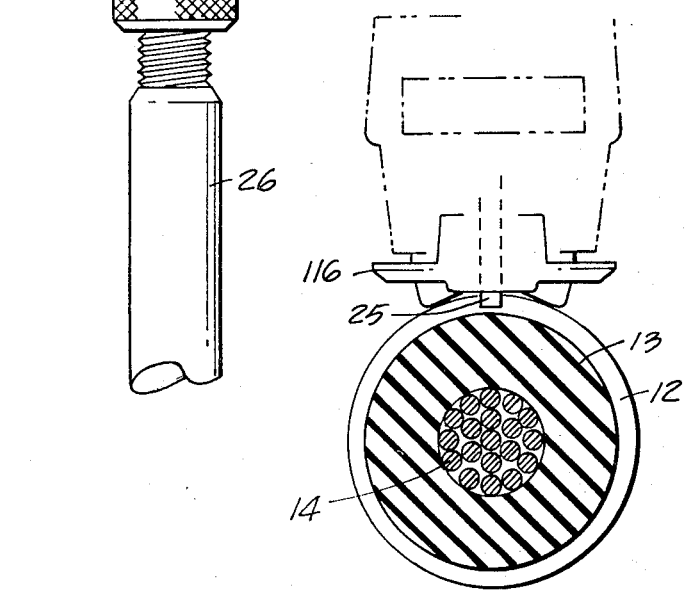

Accordingly, as shown in FIG. 7, blade 25 may be lowered into contact with the covering 12 by rotation of disk 116. This covering 12 may be scribed in the manner described hereinabove by rotation of tool 10. Of course, there is no interference from blade 24 since this blade 24 is in the FIG. 3 or blocked position. As shown in FIG. 5, the upper surface 119 of disk 116 may have suitable indicia thereon corresponding to micrometer adjustments for controlling the downward extent of blade 25 and thus the depth of the cut. Since pin 128 is connected to blade 25 via the aforementioned intermediate elements, the blade 25 may be slightly rotated about its axis to change the angle of cut thereof. This is accomplished by merely moving pin 128 within opening 131 and about the configured portion 143 of spring 141. The set screw 139 may be tightened to securely hold the pin 128 in either position. Thus, blade 25 may be used to score both square cuts and spiral cuts in covering 12.

As described above with respect to blade 24, blade 25 can thus scribe radially when flat to the covering 12 (as does blade 24) by positioning pin 128 or cut spirally in the second position. The set screw 139 permits adjustment of the pin 128 and thus blade 25 for square cut-off. Both blades 24 and 25 can never be down at the same time and tool 10 may thus be used more efficiently. The cut covering 12 may then be cut by the larger blade 24 in the manner described hereinabove and the cut covering 12 peeled off by a screwdriver or the like. Of course, the insulation 13 may be scribed in like manner using scribing blade 25, then cut using blade 24. Of course, cable 16 may have a plurality of such layers and the terms "covering" and "insulation" are used to refer to each of these layers regardless of their function. Thus, cable 16 may be trimmed in any manner suitable for the operations being carried out.

It can be seen from the foregoing that a novel tool is described for cutting layers of insulation or the like, regardless of their hardness, from cables in a quick, safe and efficient manner.

What is claimed is:

1. A tool for removing insulation or the like from insulated conductor cable comprising:
   cable engaging means having spaced elements engageable with circumferentially spaced portions of a cable positioned therebetween, said elements permitting rotation of a cable therein;
   a blade assembly overlying said cable engaging means including a main cutting blade having a cutting edge, said main cutting blade extending generally normal to the axis of a cable positioned on said cable engaging means;
   main cutting blade moving and locking means associated with said assembly for selectively moving said main cutting blade in a linear direction along the main cutting blade length and for locking said main cutting blade in selected depths of insulation penetration;
   means associated with said assembly for changing the angular disposition of said main cutting blade about an axis defined by said linear main cutting blade movement independent of said linear main blade moving and locking means and while said main cutting blade is engaged with the insulation;

means associated with said assembly for locking said main cutting blade in selected positions of angular disposition;
   a scribing blade associated with said assembly and spaced from said main cutting blade, said scribing blade having a cutting edge and also extending generally normal to the axis of a cable positioned on said cable engaging means;
   scribing blade moving and locking means associated with said assembly for selectively moving said scribing blade in a linear direction along the scribing blade length and for locking said scribing blade in selected depths of insulation penetration; and
   means operatively engaging both of said blades for preventing the lowering of one of said blades into contact with a cable retained by said cable engaging means when the other of said blades is lowered into contact therewith.

2. The tool of claim 1 further including means associated with said assembly for changing the angular disposition of said scribing blade about an axis defined by said linear scribing blade movement independent of said linear scribing blade moving and locking means and while said scribing blade is engaged with the insulation; and
   means associated with said assembly for locking said scribing blade in selected positions of angular disposition.

3. The tool of claim 1 wherein the means for preventing the lowering of one of said blades includes a plate selectively movable from a first position into abutting engagement with the lowermost cutting edge of said main cutting blade for blocking said main cutting blade from further lowering thereof into engagement with said cable and to a second position for unblocking said main cutting blade.

4. The tool of claim 3 wherein said scribing blade moving and locking means includes means thereon adapted to cooperate with said plate to allow said plate to move between said blocking and unblocking positions.

5. The tool of claim 4 wherein said means cooperating with said plate includes a rotatable disk fixedly secured to said scribing blade, the rotation of said disk raising and lowering said scribing blade, and an opening in said disk for receiving said plate when said plate is in its second position, the rotation of said disk being blocked when said plate is disposed in said opening.

6. A tool as set forth in claim 1 in which means are provided for selectively moving said elements from and towards each other for accommodating different diameter cable sizes.

7. A tool as set forth in claim 1 in which said elements include a plurality of angularly related planar surfaces extending generally normal to said blade.

8. A tool as set forth in claim 3 in which a pair of said surfaces defines a generally V-shaped configuration and another of said surfaces overlies the same and has an end portion terminating inwardly of the corresponding end portions of said pair of surfaces, and said blades extending downwardly from adjacent said first mentioned end portion in overlying relation to said corresponding end portions.

9. A tool as set forth in claim 1 including a manually engageable handle extending longitudinally from said cable engaging means in general parallel relation to said blade, at least one of said elements being carried on said handle for movement therealong, and means for releasably securing at least one of said elements to said handle in selective positions of movement therealong.

10. A tool as set forth in claim 1 in which said blade assembly includes a generally cylindrical blade holder for holding said main cutting blade and a bore in said assembly for receiving said holder, a manually engageable knob threadedly engaged with said holder whereby rotation of said knob effects axial movement of said holder in said bore.

11. A tool as set forth in claim 10 in which means are provided for restraining rotation of said holder during knob rotation while permitting said axial movement, and means extending radially outwardly from said holder for selectively varying the rotational disposition of said holder relative to said bore independent of said knob rotation and independent of the axial position thereof.

12. A tool as set forth in claim 11 in which said last named means includes a bushing rotatably journalled in said bore and having an inwardly directed lug, said holder having an axially extending peripheral groove receiving said lug.

13. A tool as set forth in claim 12 in which said bushing is provided with a manually engageable radially extending element for effecting holder rotation.

14. A tool as set forth in claim 13 including means for releasably locking said latter element on said assembly.

15. A tool as set forth in claim 1 in which said blade assembly includes a blade holder rotatably mounted therein for holding said main cutting blade, and said last named means including a member connected to and extending radially outwardly from said holder for selectively rotating the holder in said assembly to provide an infinite number of angular dispositions of said main cutting blade.

16. A tool as set forth in claim 15 including means for locking said radially extending member in desired positions.

* * * * *